No. 868,917. PATENTED OCT. 22, 1907.
T. H. DONLON.
ANIMAL TRAP.
APPLICATION FILED JAN. 28, 1907.
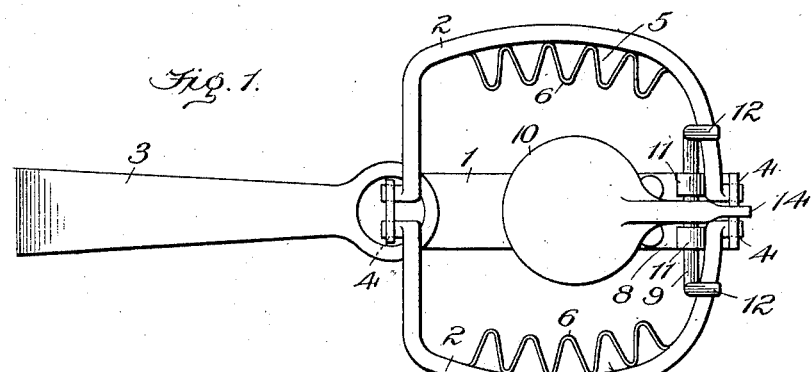
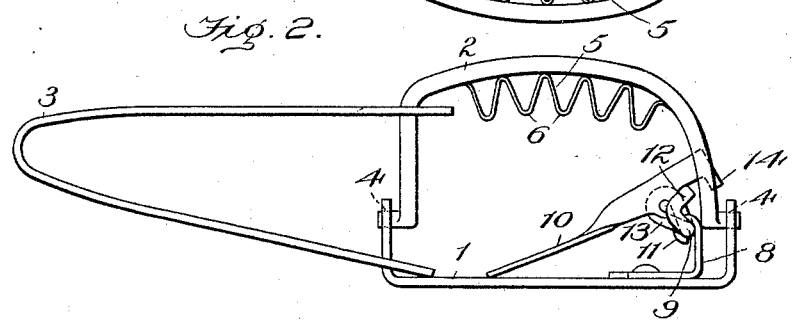
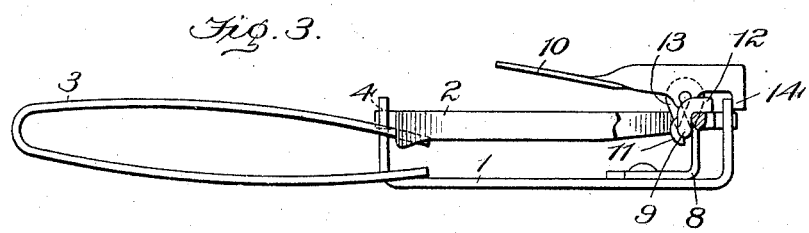
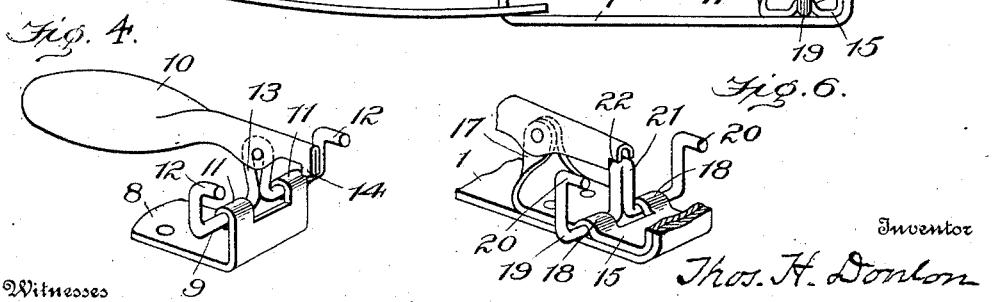
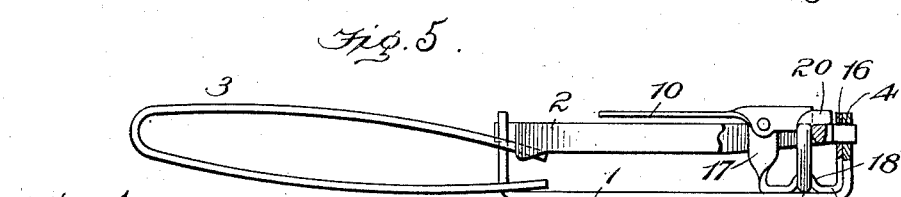
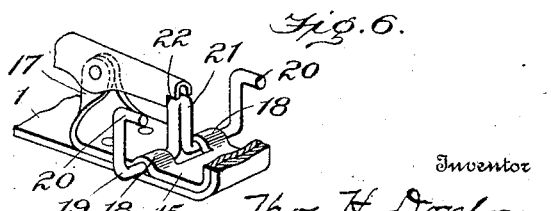
Witnesses
Edwin L Bradford
P. H. Burch
Inventor
Thos. H. Donlon
By J. R. Nottingham
Attorney

UNITED STATES PATENT OFFICE.

THOMAS H. DONLON, OF SYRACUSE, NEW YORK.

ANIMAL-TRAP.

No. 868,917.   Specification of Letters Patent.   Patented Oct. 22, 1907.

Application filed January 28, 1907. Serial No. 354,446.

*To all whom it may concern:*

Be it known that I, THOMAS H. DONLON, a citizen of the United States, residing at Syracuse, in the county of Onondaga and State of New York, have invented certain new and useful Improvements in Animal-Traps; and I do hereby declare the following to be a full, clear, and exact description of the invention, such as will enable others skilled in the art to which it appertains to make and use the same.

My invention relates to that class of animal-traps commonly known as "jaw" traps; and it consists of a novel means by which the jaws of the trap are held open and the bait-pan in set-position.

The invention further consists of the peculiar construction of the several parts and their general arrangement and combination, as will be hereinafter fully described in this specification and briefly stated in the claim.

The principal objects of the invention are to simplify and cheapen the cost of construction of this class of traps, and to render the setting-mechanism more sensitive to disturbance by animals, so that it will be practically impossible for them to disturb the bait without being caught.

Other objects of the invention will become apparent upon a complete disclosure thereof.

In the drawing—Figure 1 is a plan view of the trap in set-position; Fig. 2, a side elevation, showing the parts in normal or unset-position; Fig. 3, a similar view, showing the parts in set-position, a portion of one of the jaws being broken away to more clearly show the setting-mechanism; Fig. 4, a perspective view of the setting-mechanism; Fig. 5, a similar view to Fig. 3, showing a modified form of setting-mechanism, and Fig. 6 a perspective view of the modified setting-mechanism.

In the several views, the numeral 1 indicates the base-plate, 2 the jaws, and 3 the spring.

The respective ends of the base-plate are bent up, and the bent up ends are provided with apertures 4, 4, in which are pivoted the jaws. Each jaw is provided with a guard 5, composed of a series of downwardly-extending fingers 6 which serve to prevent a caught animal from gnawing himself loose, if caught by the foot. The jaws are closed, and maintained in closed position, by the pressure exerted by the spring 3, which is of the usual type employed in this class of traps.

The setting-mechanism is composed of an angle-plate 8, a rockable-bar 9, and a bait-plate or pan 10. The angle-plate is rigidly secured to the base-plate and is provided with ears 11, 11, in which is journaled the rockable-bar 9. The respective ends of the rockable-bar are bent to form hooks 12, 12, which are adapted to engage the jaws when the trap is set. The central portion of the rockable-bar is provided with a lug 13, to which the bait-pan is pivoted. The front end of the bait-pan is provided with a hook or catch 14, which is adapted to engage the front bent up end of the base-plate, when the rockable-bar is rocked forward to cause its hooked ends to engage the jaws, as shown in Fig. 3.

When the trap is set, the pressure exerted by the spring-pressed jaws upon the hooked ends of the rockable-bar causes the catch or hooked end of the bait-pan to engage the upturned end of the base-plate, with sufficient frictional-contact to hold the jaws in set-position. When an animal tries to take the bait the frictional contact is broken, setting the jaws free to the action of the spring and catching the animal.

In the modification shown in Figs. 5 and 6, the setting-mechanism is composed of an angle-plate 15, which has its forward end bent upward and provided with apertures 16, 16, corresponding with the apertures 4, 4, through which pass the pivots of the respective jaws. The other end of the angle-plate 15 is also bent upward, and forms a stud or post 17 to which the bait-pan is pivoted. The central portion of the angle-plate is provided with oppositely-disposed ears 18, 18, in which the rockable-bar 19 is journaled. The rockable-bar is provided with engaging-hooks 20, 20, adapted to engage the jaws when the trap is to be set, and with a central stud 21 adapted to engage a notch or recess 22 in the front end of the bait-pan, as shown in Fig. 6. In this form of setting-mechanism, the pressure exerted by the spring-pressed jaws upon the hooked ends of the rockable-bar, tends to force the stud 21 against the vertical wall of the notch 22, with sufficient frictional-contact to maintain the jaws in set position, until the contact is broken by an animal seeking to obtain the bait secured upon the bait-pan.

Having thus fully described my invention what I claim and desire to secure by Letters Patent, is—

1. In an animal-trap, the combination with a suitable base-plate and spring-actuated jaws, of an angle-plate, a rockable-bar journaled in said angle-plate and provided with jaw-engaging hooks, and a pivoted bait-pan.

2. In an animal-trap, the combination with a suitable base-plate, and spring-actuated jaws provided with guard-fingers, of an angle-plate, a rockable-bar journaled in said angle-plate and provided with jaw-engaging hooks, and a pivoted bait-pan.

3. In an animal-trap, the combination with a suitable base-plate and spring-actuated jaws, of an angle-plate, a rockable-bar journaled in said angle-plate, said rockable-bar being provided with hooks adapted to engage the spring-actuated jaws, a vertical catch, and a bait-pan having its forward end adapted to engage said catch, so that when the bait-pan is set, the pressure exerted by the jaws will cause the rockable-bar to hold said bait-pan in its set position.

4. In an animal-trap, the combination with a base-plate having an upturned end, and spring-actuated jaws provided with guard-fingers, of an angle-plate, a rockable-bar journaled in the angle-plate, and a bait-pan pivoted to the rockable-bar, said rockable-bar being provided with hooks adapted to engage the spring-actuated jaws, and the bait-pan provided with an end adapted to engage the upturned end of the base-plate, so that when the bait-pan is set, the pressure exerted by the jaws will cause the rockable-bar to hold said bait-pan in its set position.

In testimony whereof I affix my signature, in the presence of two witnesses.

THOMAS H. DONLON.

Witnesses:
JOHN J. MALONEY,
JERRY W. DONOVAN.